(12) United States Patent
Yang

(10) Patent No.: US 10,529,503 B2
(45) Date of Patent: Jan. 7, 2020

(54) INTERLOCKING STRUCTURE OF POWER CONVERSION SYSTEM AND OPERATION METHOD THEREFOR

(71) Applicant: DELTA ELECTRONICS, INC., Taoyuan (TW)

(72) Inventor: Yung-Hung Yang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/135,641

(22) Filed: Sep. 19, 2018

(65) Prior Publication Data

US 2019/0304714 A1    Oct. 3, 2019

(30) Foreign Application Priority Data

Apr. 3, 2018  (CN) .......................... 2018 1 0303722

(51) Int. Cl.
| | |
|---|---|
| *H01H 9/28* | (2006.01) |
| *H02J 9/06* | (2006.01) |
| *H01H 9/26* | (2006.01) |
| *H02J 9/04* | (2006.01) |

(52) U.S. Cl.
CPC .............. *H01H 9/286* (2013.01); *H01H 9/26* (2013.01); *H02J 9/061* (2013.01); *H01H 2009/265* (2013.01); *H01H 2300/018* (2013.01); *H02J 9/04* (2013.01)

(58) Field of Classification Search
CPC ............................ H02J 9/286; H01H 2300/018
See application file for complete search history.

(56) References Cited

U.S. PATENT DOCUMENTS

| | | | | |
|---|---|---|---|---|
| 6,043,439 A * | 3/2000 | Crooks | ..................... | H01H 9/26 200/50.32 |
| 6,521,849 B1 * | 2/2003 | Flegel | ..................... | H01H 9/26 200/50.32 |
| 8,040,663 B1 * | 10/2011 | Czarnecki | ............... | H01H 9/26 200/50.32 |
| 9,007,745 B1 * | 4/2015 | Flegel | ..................... | H02B 1/16 361/627 |

(Continued)

OTHER PUBLICATIONS

Wikipedia contributors. "Series and parallel circuits." Wikipedia, The Free Encyclopedia. Wikipedia, The Free Encyclopedia, Oct. 18, 2019. Web. Oct. 25, 2019. (Year: 2019).*

*Primary Examiner* — Daniel J Cavallari
(74) *Attorney, Agent, or Firm* — Muncy, Geissler, Olds & Lowe, P.C.

(57) ABSTRACT

An interlocking structure of a power conversion system is provided. A first power circuit group is connected to a first power source and includes a first and a fourth switch. A second power circuit group is connected to a second power source and includes a second and a fifth switch. A limiting mechanism includes a first limiting portion, a second limiting portion, a fourth limiting portion, a fifth limiting portion, a first accommodating portion, and a second accommodating portion. The first switch is switched off to disconnect the first power source. Then, a limiting structure is moved to connect the second power source. Accordingly, the first power source is disconnected, and the second power source is connected, allowing repair or maintenance of the first power source to be performed without interrupting the supply of power from the power conversion system.

11 Claims, 10 Drawing Sheets

(56) References Cited

U.S. PATENT DOCUMENTS

| | | | |
|---|---|---|---|
| 9,343,925 B1* | 5/2016 | Flegel | H02J 9/00 |
| 2008/0149467 A1* | 6/2008 | Somalingayya | H01H 9/26 |
| | | | 200/50.33 |

* cited by examiner

INTERLOCKING STRUCTURE OF POWER CONVERSION SYSTEM AND OPERATION METHOD THEREFOR

TECHNICAL FIELD

The present invention relates to an interlocking structure and, in particular, to a mechanical interlocking structure in a power system.

BACKGROUND

For power distribution and rationing, adding auxiliary power source, management of power, or other reasons, multiple circuit breakers are used in a power system to constitute a mechanical interlock mechanism so as to improve stability and quality of the supply of power.

Furthermore, a conventional mechanical interlock mechanism uses a locking device and a key for control and management (so called KerKey). However, this requires multiple locking devices and keys, and these keys may become lost or confused. Moreover, a complex process is involved for operating the conventional mechanical interlock mechanism, so it is easy to cause improper operations such as sequence errors or missing steps during operation.

In view of this, the inventor studied various technologies and created an effective solution in the present disclosure.

SUMMARY

It is an objective of the present invention to provide an interlocking structure of a power conversion system, for disconnecting a first power source and connect the second power source, so that repair or maintenance can be performed on the first power source without interrupting the power supplied by the power conversion system.

Accordingly, the present invention provides an interlocking structure of a power conversion system for controlling a first power source and a second power source connected in parallel to disconnect the first power source and connect the second power source. The interlocking structure includes a first power circuit group, a second power circuit group and a limiting mechanism. The first power circuit group is connected to the first power source and includes a first circuit breaker and a fourth circuit breaker connected in parallel. The second power circuit group is connected to the second power source and connected to the first power circuit group in parallel. The second power circuit group includes a second circuit breaker at one side of the first circuit breaker and includes a fifth circuit breaker at one side of the fourth circuit breaker. The limiting mechanism includes a first limiting structure movable in a left-right direction with respect to the first circuit breaker and the second circuit breaker, a second limiting structure movable in the left-right direction with respect to the fourth circuit breaker and the fifth circuit breaker, and a limiting bar movable in an up-down direction with respect to the first limiting structure and the second limiting structure. The first limiting structure includes a first limiting portion for blocking the first circuit breaker and a second limiting portion for blocking the second circuit breaker. The second limiting structure includes a fourth limiting portion for blocking the fourth circuit breaker and a fifth limiting portion for blocking the fifth circuit breaker. The limiting bar includes a first accommodating portion for receiving the fourth limiting portion and a second accommodating portion for receiving the fifth limiting portion.

Accordingly, the present invention provides an operation method for an interlocking structure of a power conversion system, for controlling a first power source and a second power source connected in parallel to disconnect the first power source and connect the second power source. The operation method comprises steps as follows: providing a first power circuit group and a second power circuit group, the first power circuit group being connected to the first power source and including a first circuit breaker and a fourth circuit breaker connected in parallel, the second power circuit group being connected to the second power source and including a second circuit breaker and a fifth circuit breaker connected in parallel, wherein the first circuit breaker and the second circuit breaker are in a switched-on state, and the fourth circuit breaker and the fifth circuit breaker are in a switched-off state, so the first power source and the second power source are both connected; providing a limiting mechanism, the limiting mechanism including a first limiting portion for blocking the first circuit breaker and a second limiting portion for blocking the second circuit breaker, a fourth limiting portion for blocking the fourth circuit breaker, a fifth limiting portion for blocking the fifth circuit breaker, a first accommodating portion for receiving the fourth limiting portion, and a second accommodating portion for receiving the fifth limiting portion; switching off the first circuit breaker to disconnect the first power source; moving leftward a first limiting structure, so that the first limiting portion blocks the first circuit breaker to prevent it from being switched on, and the second limiting portion is moved with the first limiting portion, so that the second circuit breaker is prevented from being switched off; moving upward the limiting bar to align the second accommodating portion with the fifth limiting portion; moving leftward the fifth limiting portion to receive it in the second accommodating portion to unblock the fifth circuit breaker; and switching on the fifth circuit breaker to connect the second power source.

Compared with conventional techniques, the interlocking structure of the power conversion system in the present invention utilizes the limiting mechanism to block the circuit breaker so as to control the switched-on and switched-off states of the circuit breaker and also prevent the circuit breakers from being operated at the same time to cause improper operations. The accommodating portion allows movement of the limiting mechanism, so that the circuit breaker can be switched on to thereby disconnect the first power source and connect the second power source for maintenance or repair of the first power source. As a result, the power supplied by the power conversion system is not interrupted during maintenance or repair, which improves convenience and practicability.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Detailed descriptions and technical contents of the present disclosure are illustrated below in conjunction with the accompanying drawings. However, it is to be understood that the descriptions and the accompanying drawings disclosed herein are merely illustrative and exemplary and not intended to limit the scope of the present disclosure.

Figure 1:
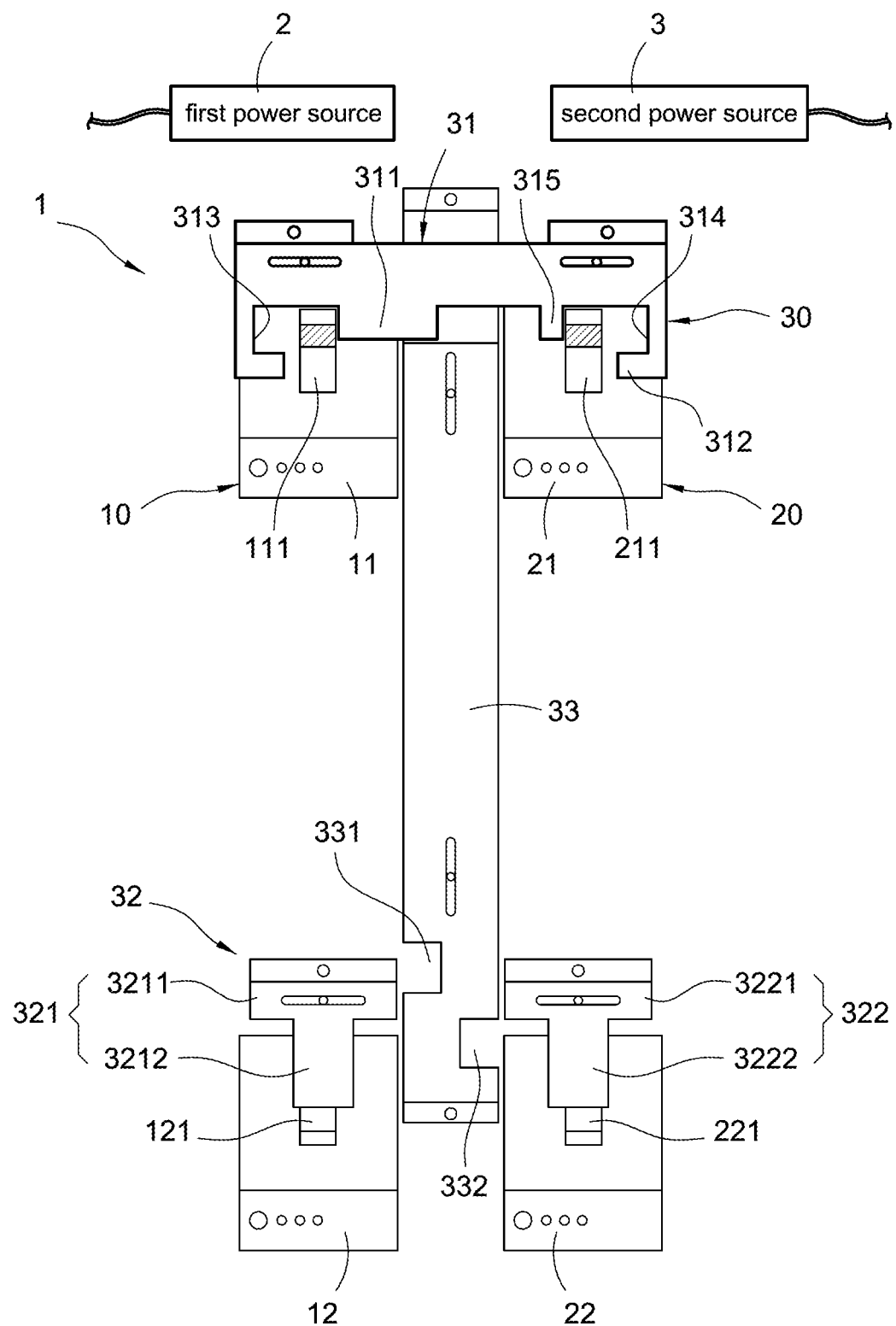
FIG. 1 is a plan view illustrating an interlocking structure of a power conversion system.
Figure 2:
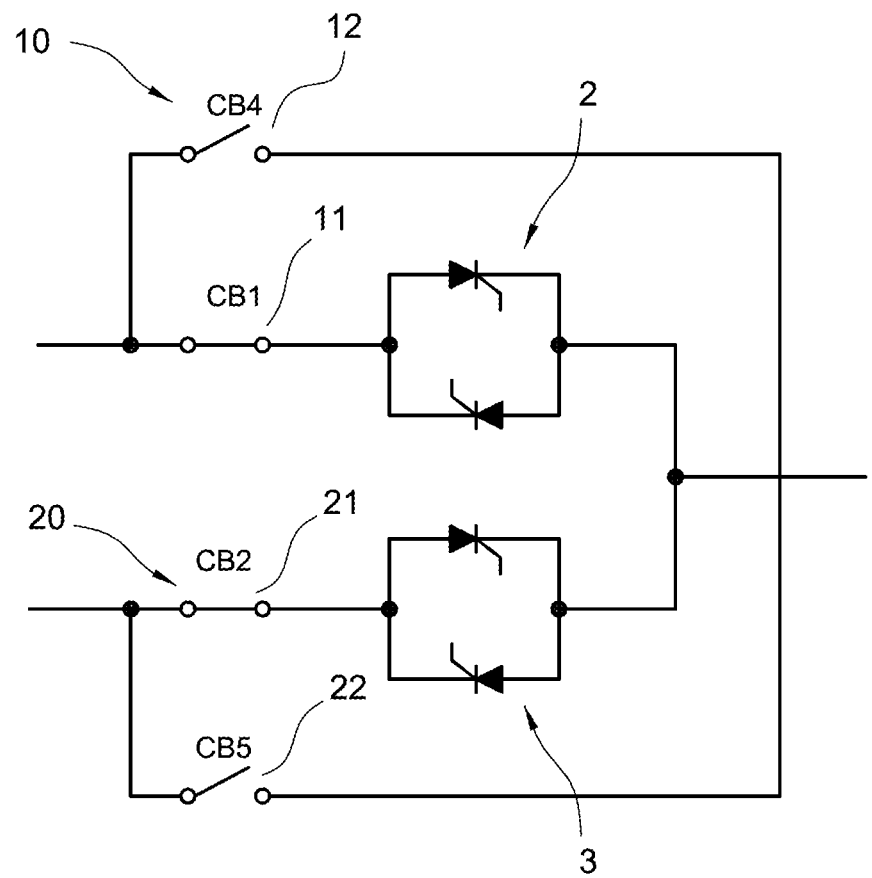
FIG. 2 is a circuit view illustrating the interlocking structure of the power conversion system.

Please refer to FIGS. 1 and 2 for a plan view and a circuit view illustrating an interlocking structure of a power conversion system. The present invention relates to an interlocking structure 1 of a power conversion system for controlling a first power source 2 and a second power source 3 connected in parallel. By using a switching control design, the power conversion system chooses to supply power from the first power source 2 or the second power source 3. In the present embodiment, the power conversion system disconnects the first power source 2 and connects the second power source 3 by means of the interlocking structure 1, so that repair or maintenance can be performed on the first power source 2 without interrupting the supply of power from the power conversion system. By implementing the present invention, stable and safe supply of power can be ensured with high quality in a power system. The interlocking structure 1 of the power conversion system is further detailed as follows.

The interlocking structure 1 of the power conversion system includes a first power circuit group 10, a second power circuit group 20 and a limiting mechanism 30. The first power circuit group 10 is connected to the first power source 2 and includes a first circuit breaker 11 and a fourth circuit breaker 12 connected in parallel. In the present embodiment, the first circuit breaker 11 includes a first switch 11, and the fourth circuit breaker 12 includes a fourth switch 121.

The second power circuit group 20 is connected to the second power source 3 and connected to the first power circuit group 10 in parallel. The second power circuit group 20 includes a second circuit breaker 21 arranged parallel to the first circuit breaker 11 at one side thereof and includes a fifth circuit breaker 22 arranged parallel to the fourth circuit breaker 12 at one side thereof. In the present embodiment, the second circuit breaker 21 includes a second switch 211. The fifth circuit breaker 22 includes a fifth switch 221. In the present embodiment, the first circuit breaker 11 and the second circuit breaker 21 are in a switched-on state. The fourth circuit breaker 12 and the fifth circuit breaker 22 are in a switched-off state. Therefore, the first power source 2 and the second power source 3 are both connected to supply power.

The limiting mechanism 30 includes a first limiting structure 31 movable in a left-right direction with respect to the first circuit breaker 11 and the second circuit breaker 21, a second limiting structure 32 movable in the left-right direction with respect to the fourth circuit breaker 12 and the fifth circuit breaker 22, and a limiting bar 33 movable in an up-down direction with respect to the first limiting structure 31 and the second limiting structure 32.

In detail, the first limiting structure 31 includes a first limiting portion 311 for blocking the first circuit breaker 11 and a second limiting portion 312 for blocking the second circuit breaker 21. In the present embodiment, the first limiting portion 311 is a block, and the second limiting portion 312 is an arm. The first limiting portion 311 and the second limiting portion 312 are staggered with respect to each other in a perpendicular direction. When the first limiting portion 311 is moved leftward toward the first circuit breaker 11, the second limiting portion 312 and the first limiting portion 311 move together in linked relation, so that the second circuit breaker 211 and the first circuit breaker 111 from being operated at the same time.

The second limiting structure 32 includes a fourth limiting portion 321 for blocking the fourth circuit breaker 12 and a fifth limiting portion 322 for blocking the fifth circuit breaker 22. The limiting bar 33 includes a first accommodating portion 331 for receiving the fourth limiting portion 321 and a second accommodating portion 332 for receiving the fifth limiting portion 322. In the present embodiment, the fourth limiting portion 321 and the fifth limiting portion 322 are disposed at the same height level. The first accommodating portion 331 and the second accommodating portion 332 are two openings formed on the limiting bar 33 to provide space. The limiting bar 33 is disposed between the first power circuit group 10 and the second power circuit group 20. The first accommodating portion 331 and the second accommodating portion 332 are staggered with respect to each other in the perpendicular direction. By using the configuration of the first accommodating portion 331 and the second accommodating portion 332, the second limiting structure 32 prevents the fourth limiting portion 321 and the fifth limiting portion 332 from moving at the same time.

In detail, the fourth limiting portion 321 and the fifth limiting portion 322 are each a block. The fourth limiting portion 321 includes a fourth blocker 3211 and a fourth blocking pillar 3212 connected to the fourth blocker 3211. Similarly, the fifth limiting portion 322 includes a fifth blocker 3221 and a fifth blocking pillar 3222 connected to the fifth blocker 3221. In detail, the first accommodating portion 331 and the second accommodating portion 332 are each an opening. The first accommodating portion 331 is open toward the fourth circuit breaker 12 for receiving one end of the fourth blocker 3211. The second accommodating portion 332 is open toward the fifth circuit breaker 22 for receiving one end of the fifth blocker 3221. By using the configuration of the first accommodating portion 331 and the second accommodating portion 332, the fourth limiting portion 321 and the fifth limiting portion 322 are movable in the left-right direction.

According to one embodiment of the present invention, the first limiting structure 31 includes a first recess 313 for receiving the first switch 111 and a second recess 314 for receiving the second switch 211. The first recess 313 is disposed adjacent to the first limiting portion 311 at one side thereof, and the second recess 314 is disposed adjacent to the second limiting portion 312 at one side thereof.

The first limiting structure 31 further includes a blocking rib 315 disposed between the first limiting portion 311 and the second recess 314. When the limiting bar 33 is moved upward, the limiting bar 33 is disposed between the first limiting portion 311 and the blocking rib 315 to prevent causing movement of the first limiting structure 31.

Please refer to FIGS. 3 to 7, illustrating operations of the interlocking structure of the power conversion system. The present invention provides an operation method for the interlocking structure of the power conversion system, for controlling the first power source 2 and the second power source 3 connected in parallel. The first power source 2 is disconnected, and the second power source 3 is connected by using the operation method as detailed below.

Figure 3:
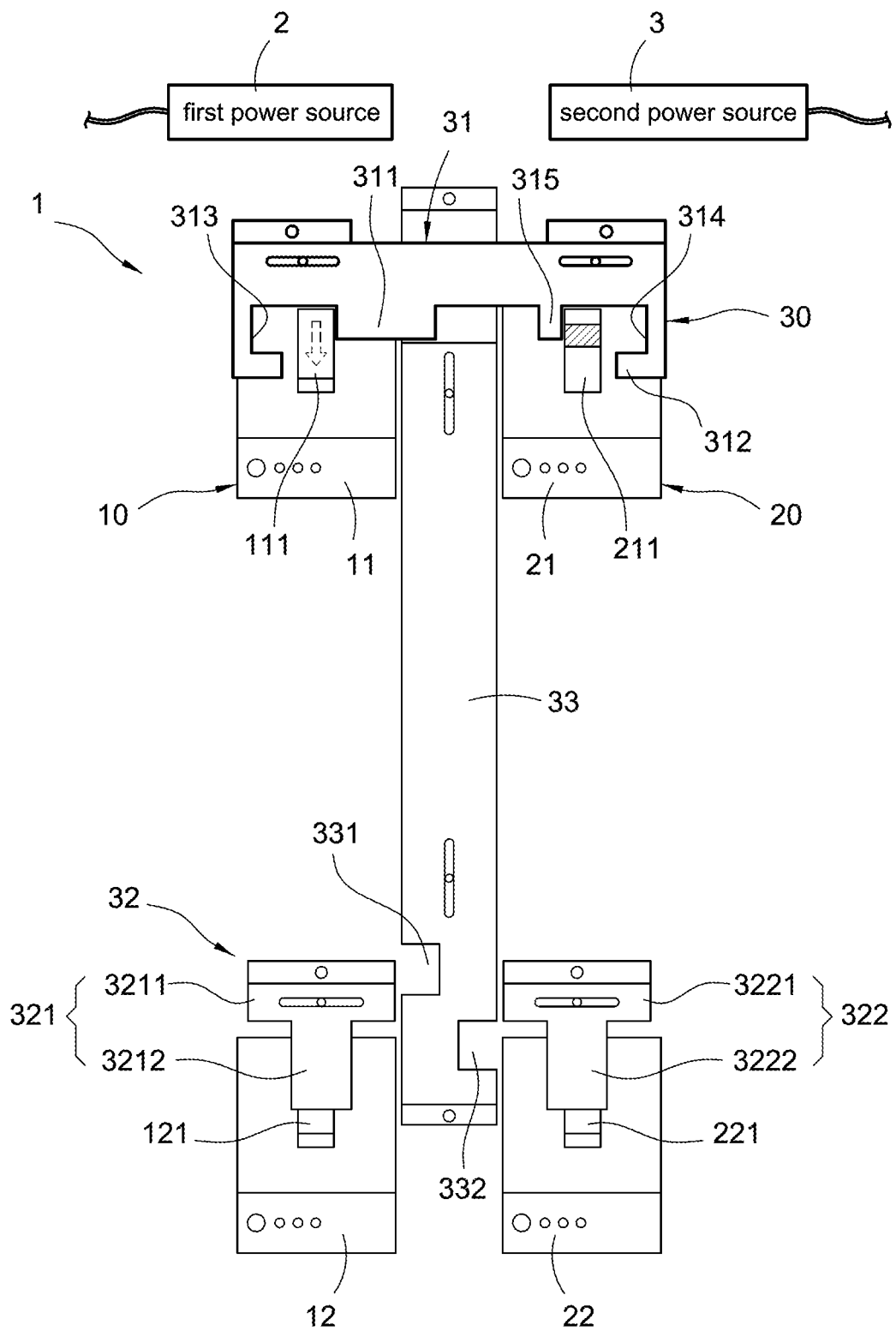
FIGS. 3 to 7 illustrate operations of the interlocking structure of the power conversion system.

Referring to FIG. 3, first of all, the first switch 111 of the first circuit breaker 11 is switched off to disconnect the first power source 2. At this point, the first circuit breaker 11 and the fourth circuit breaker 12 connected to the first power source 2 are both in the switched-off state, so the first power source 2 can be safely removed from the power conversion system.

Figure 4:
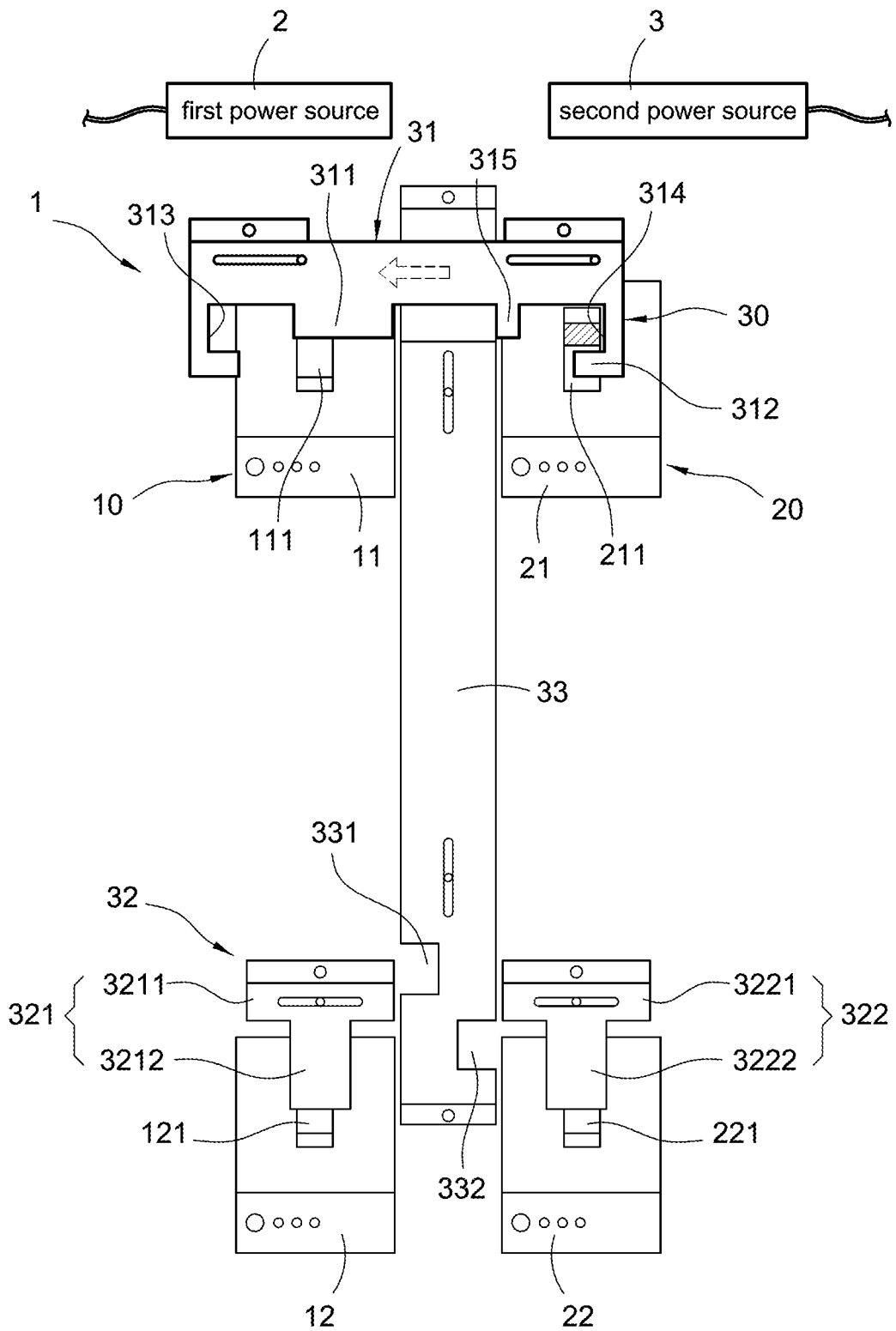

Referring to FIG. 4, the first limiting structure 31 is moved (to the left) to block the first circuit breaker 11 so as to prevent the first switch 111 from being switched on. On the other hand, the second limiting portion 312 is moved with the first limiting portion 311 to the second switch 211, so that the second switch 211 of the second circuit breaker 21 is prevented from being operated and switched off.

Figure 5:
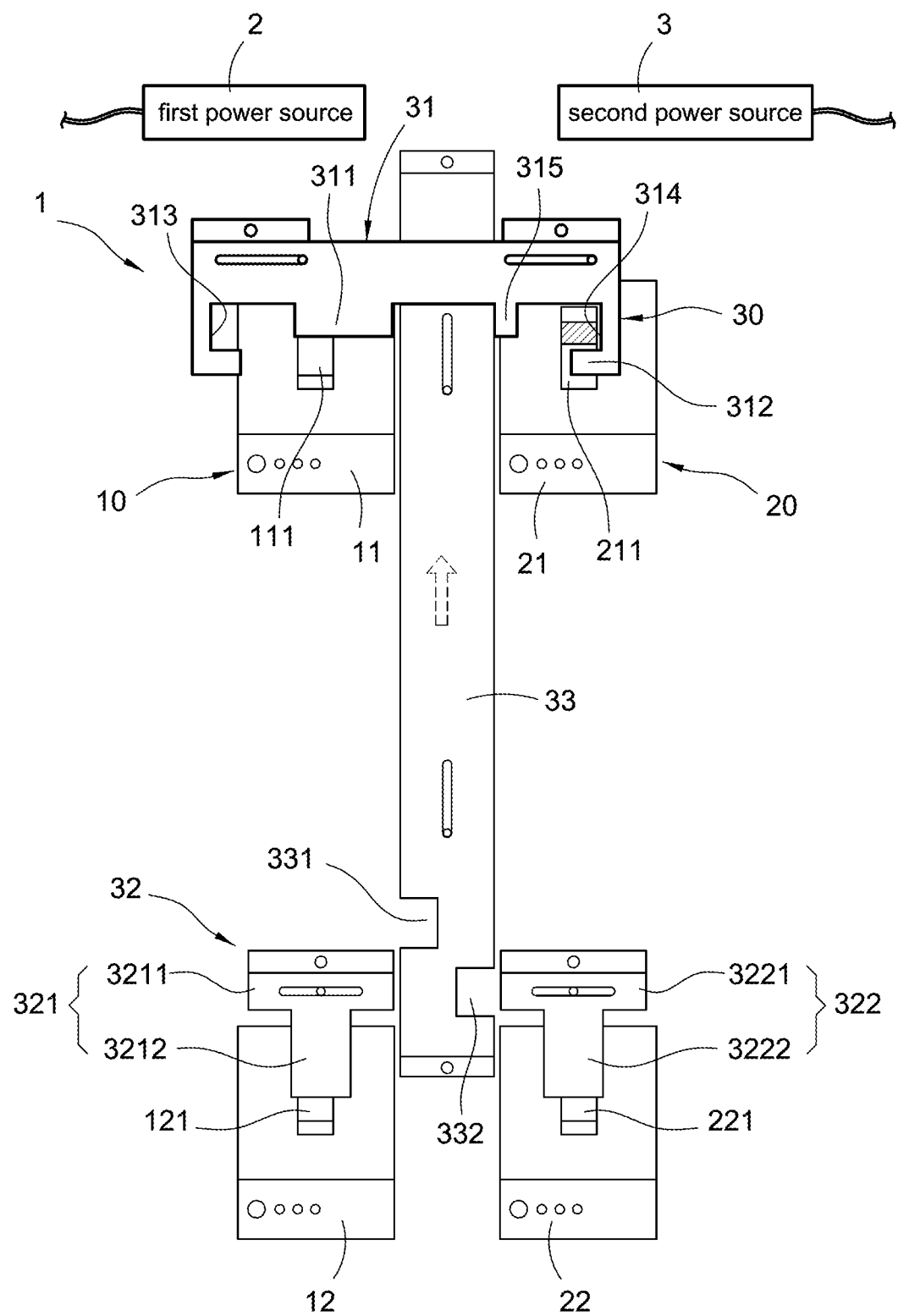

Then, as shown in FIG. 5, the limiting bar 33 is moved (upward) to align the second accommodating portion 332 with the fifth limiting portion 322. Then, the fifth limiting portion 322 can be moved leftward.

Figure 6:
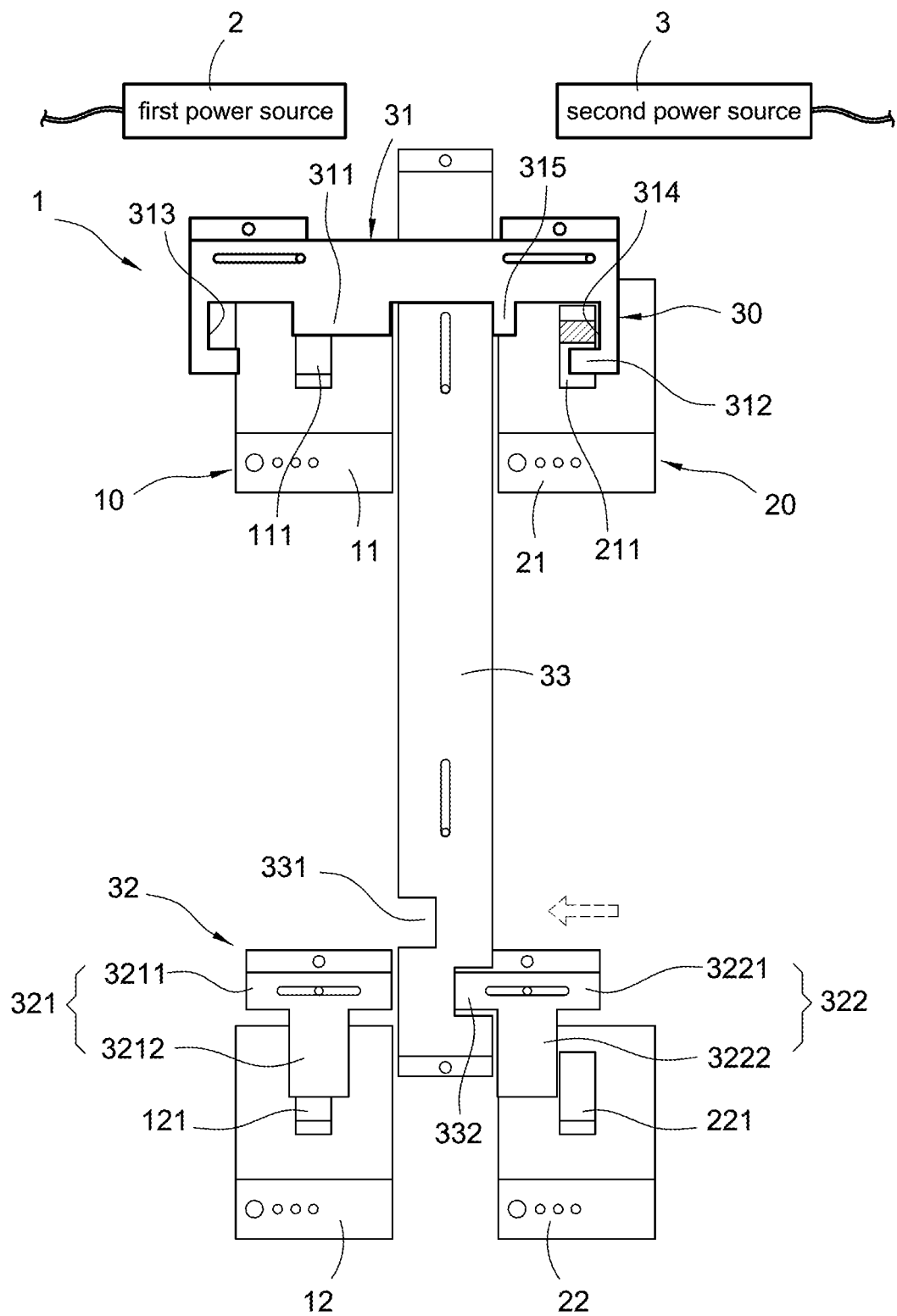

After that, referring to FIG. 6, the fifth limiting portion 322 is moved (leftward) to receive one end of the fifth blocker 3221 in the second accommodating portion 332. Then, the fifth circuit breaker 22 is not blocked by the fifth blocking pillar 3222 and can be operated.

Figure 7:
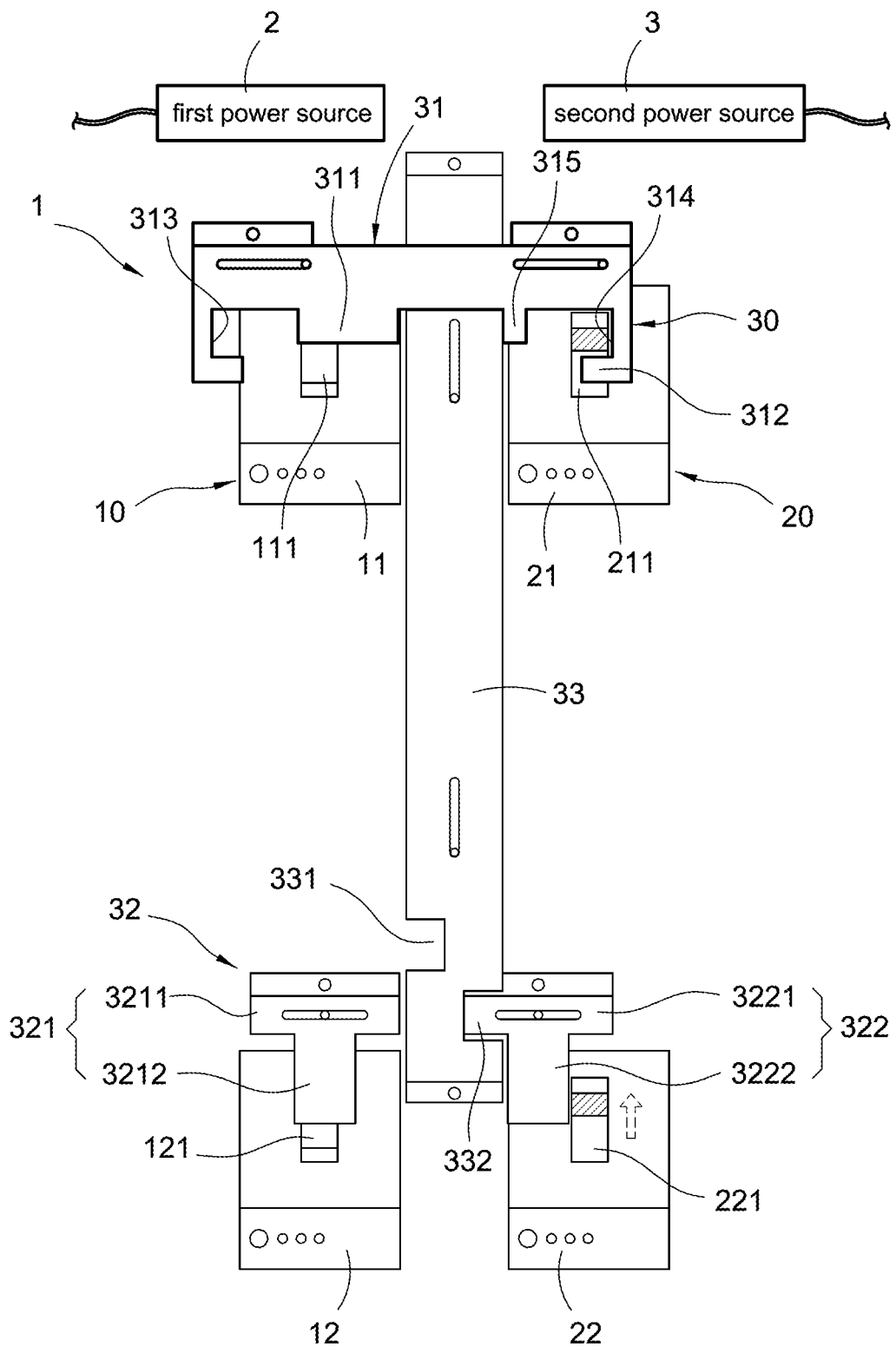

Finally, referring to FIG. 7, the fifth circuit breaker 22 is switched on. At this point, the second circuit breaker 21 and the fifth circuit breaker 22 connected to the second power source 3 are in the switched-on state, thereby ensuring that the second power source 3 is connected and can supply power.

Figure 8:
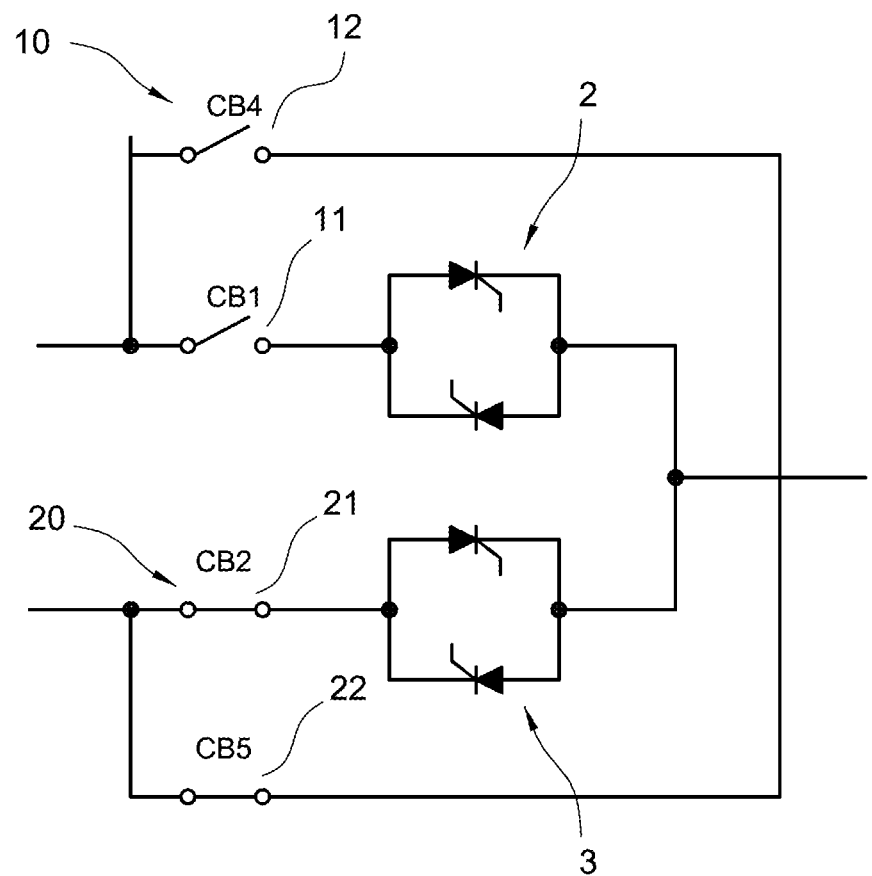
FIG. 8 is a circuit view illustrating that using an operation method for the interlocking structure of the power conversion system to disconnect the first power source and connect the second power source.

Please refer to FIG. 8 which is a circuit view illustrating that the first power source is disconnected and the second power source is connected by using the operation method for the interlocking structure of the power conversion system. In the drawing, the first circuit breaker 11 and the fourth circuit breaker 12 are both in the switched-off state, and the first power source 2 can be removed from the power conversion system for maintenance or repair. Furthermore, the second circuit breaker 21 and the fifth circuit breaker 22 are both in the switched-on state, so that the second power source 3 is connected and can supply power, thus preventing the power supplied by the power conversion system from being interrupted. Stable and safe supply of power can be ensured with high quality in a power system.

Figure 9:
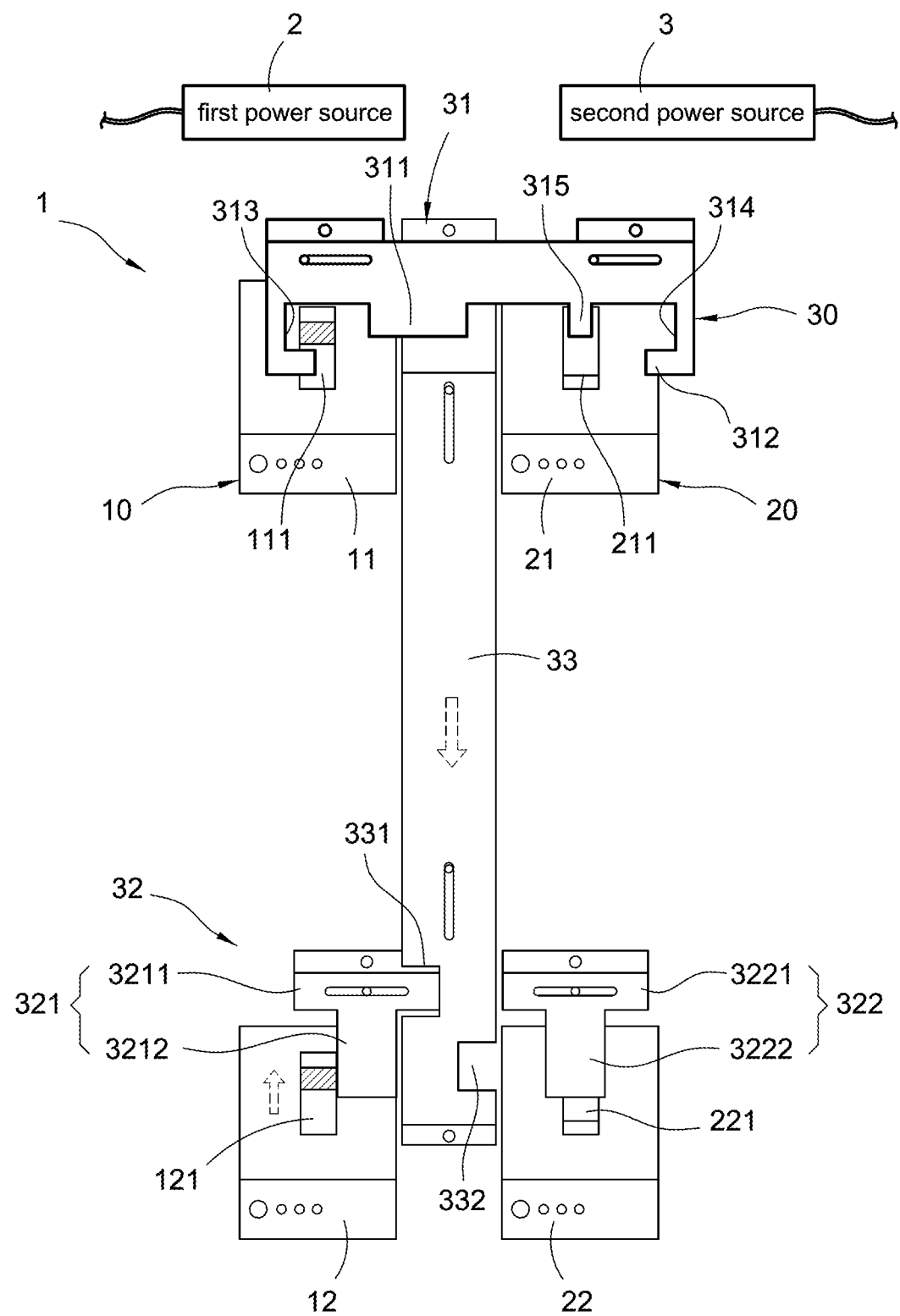
FIG. 9 illustrates operations of the interlocking structure of the power conversion system.
Figure 10:
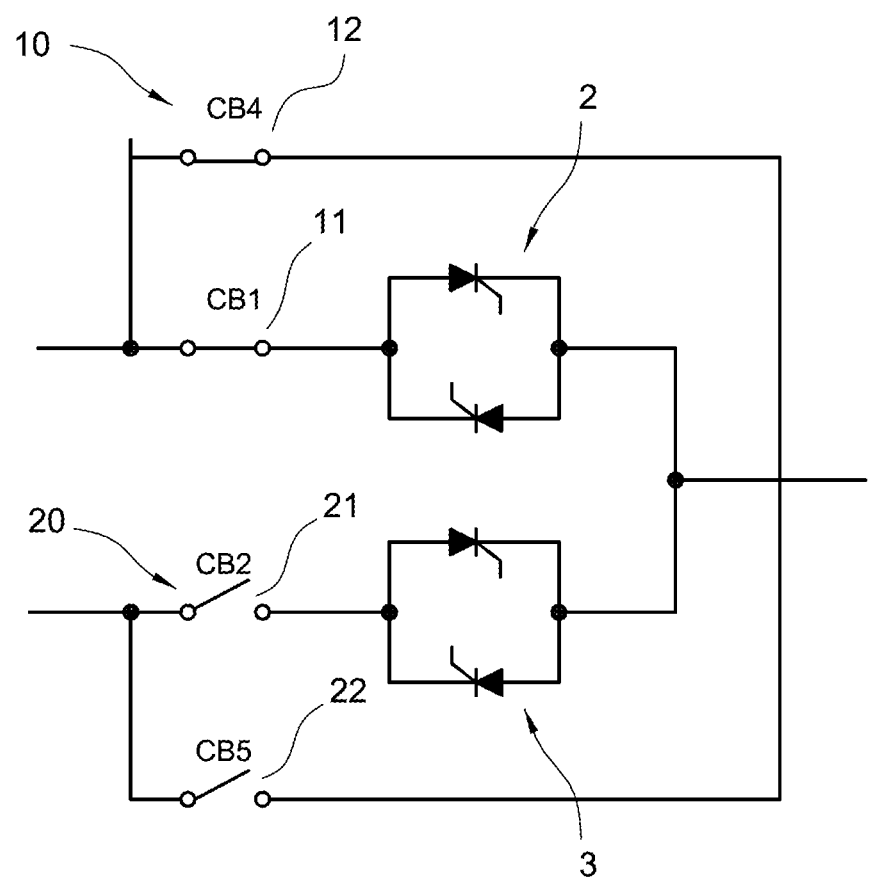
FIG. 10 is another circuit view illustrating the interlocking structure of the power conversion system.

Please refer to FIG. 9 illustrating operations of the interlocking structure of the power conversion system and refer to FIG. 10 which is another circuit view illustrating the interlocking structure of the power conversion system. The second power source 3 can be disconnected by using the operation method for the interlocking structure 1. With steps similar to the above-mentioned, the second power source 3 can be removed from the power conversion system for maintenance or repair, and at the same time, the first power source 2 is still connected to supply power, thus preventing the power supplied by the power conversion system from being interrupted.

It should be noted that, in this situation, the second circuit breaker 21 is blocked by the blocking rib 315 of the first limiting structure 31 and is thereby prevented from being switched on. The first switch 111 is in the first recess 313, so the first switch 111 is prevented from being operated and switched off. On the other hand, the limiting bar 33 is moved downward to align the first accommodating portion 331 with the fourth limiting portion 321. Then, the fourth limiting portion 321 can be moved rightward. One end of the fourth blocker 3211 is received in the first accommodating portion 331, so that the fourth circuit breaker 12 is no longer blocked by the fourth blocking pillar 3212, and the fourth circuit breaker 12 can be operated.

Accordingly, the second circuit breaker 21 and the fifth circuit breaker 22 are both in the switched-off state, so the second power source 3 can be removed from the power conversion system for maintenance or repair. Furthermore, the first circuit breaker 11 and the fourth circuit breaker 12 are in the switched-on state, so the first power source 2 is connected and can supply power, thus preventing the power supplied by the power conversion system from being interrupted. By this way, stable and safe supply of power can be ensured with high quality in a power system.

It is to be understood that the above descriptions are merely the preferable embodiment of the present invention and are not intended to limit the scope of the present invention. Equivalent changes and modifications made in the spirit of the present invention are regarded as falling within the scope of the present invention.

What is claimed is:

1. An interlocking structure of a power conversion system, for controlling a first power source and a second power source connected in parallel to disconnect the first power source and connect the second power source, comprising:
   a first power circuit group, the first power circuit group being connected to the first power source and including a first circuit breaker and a fourth circuit breaker connected in parallel;
   a second power circuit group, the second power circuit group being connected to the second power source and connected to the first power circuit group in parallel, wherein the second power circuit group includes a second circuit breaker at one side of the first circuit breaker and includes a fifth circuit breaker at one side of the fourth circuit breaker; and
   a limiting mechanism, the limiting mechanism including a first limiting structure movable in a left-right direction with respect to the first circuit breaker and the second circuit breaker, a second limiting structure movable in the left-right direction with respect to the fourth circuit breaker and the fifth circuit breaker, and a limiting bar movable in an up-down direction with respect to the first limiting structure and the second limiting structure, wherein the first limiting structure includes a first limiting portion for blocking the first circuit breaker and a second limiting portion for blocking the second circuit breaker; the second limiting structure includes a fourth limiting portion for blocking the fourth circuit breaker and a fifth limiting portion for blocking the fifth circuit breaker; the limiting bar includes a first accommodating portion for receiving the fourth limiting portion and a second accommodating portion for receiving the fifth limiting portion.

2. The interlocking structure of the power conversion system according to claim 1, wherein the first circuit breaker includes a first switch, the second circuit breaker includes a second switch, the fourth circuit breaker includes a fourth switch, and the fifth circuit breaker includes a fifth switch.

3. The interlocking structure of the power conversion system according to claim 2, wherein the first limiting structure includes a first recess for receiving the first switch and a second recess for receiving the second switch, the first recess is disposed adjacent to the first limiting portion at one side thereof, and the second recess is disposed adjacent to the second limiting portion at one side thereof.

4. The interlocking structure of the power conversion system according to claim 3, wherein the first limiting portion and the second limiting portion are staggered with respect to each other in a perpendicular direction; when the first limiting structure is moved leftward toward the first circuit breaker, the second limiting portion and the first limiting portion move together to prevent the second circuit breaker and the first circuit breaker from being operated at the same time.

5. The interlocking structure of the power conversion system according to claim 3, wherein the first limiting portion is a block, and the second limiting portion is an arm.

6. The interlocking structure of the power conversion system according to claim 4, wherein the first limiting structure further includes a blocking rib disposed between the first limiting portion and the second recess; when the limiting bar is moved upward, the limiting bar is disposed between the first limiting portion and the blocking rib to prevent causing movement of the first limiting structure.

7. The interlocking structure of the power conversion system according to claim 1, wherein the fourth limiting portion and the fifth limiting portion are respectively set as a block, the fourth limiting portion includes a fourth blocker and a fourth blocking pillar connected to the fourth blocker, and the fifth limiting portion includes a fifth blocker and a fifth blocking pillar connected to the fifth blocker.

8. The interlocking structure of the power conversion system according to claim 7, wherein the fourth limiting portion and the fifth limiting portion are disposed at the same height level, the limiting bar is disposed between the first power circuit group and the second power circuit group, and the fourth limiting portion and the fifth limiting portion are movable in the left-right direction by using the first accommodating portion and the second accommodating portion.

9. The interlocking structure of the power conversion system according to claim 8, wherein the first accommodating portion and the second accommodating portion are respectively set as an opening, the first accommodating portion is open toward the fourth circuit breaker for receiving one end of the fourth blocker, and the second accommodating portion is open toward the fifth circuit breaker for receiving one end of the fifth blocker.

10. The interlocking structure of the power conversion system according to claim 9, wherein the first accommodating portion and the second accommodating portion are staggered with respect to each other in a perpendicular direction, and by using the first accommodating portion and the second accommodating portion, the second limiting structure prevents the fourth limiting portion and the fifth limiting portion from moving at the same time.

11. An operation method for an interlocking structure of a power conversion system, for controlling a first power source and a second power source connected in parallel to disconnect the first power source and connect the second power source, the operation method comprising steps as follows:

providing a first power circuit group and a second power circuit group, the first power circuit group being connected to the first power source and including a first circuit breaker and a fourth circuit breaker connected in parallel, the second power circuit group being connected to the second power source and including a second circuit breaker and a fifth circuit breaker connected in parallel, wherein the first circuit breaker and the second circuit breaker are in a switched-on state, and the fourth circuit breaker and the fifth circuit breaker are in a switched-off state, so the first power source and the second power source are both connected;

providing a limiting mechanism, the limiting mechanism including a first limiting portion for blocking the first circuit breaker and a second limiting portion for blocking the second circuit breaker, a fourth limiting portion for blocking the fourth circuit breaker, a fifth limiting portion for blocking the fifth circuit breaker, and a limiting bar, the limiting bar including a first accommodating portion for receiving the fourth limiting portion and a second accommodating portion for receiving the fifth limiting portion;

switching off the first circuit breaker to disconnect the first power source;

moving a first limiting structure, so that the first limiting portion blocks the first circuit breaker to prevent it from being switched on, and the second limiting portion is moved with the first limiting portion, so that the second circuit breaker is prevented from being switched off;

moving the limiting bar to align the second accommodating portion with the fifth limiting portion;

moving the fifth limiting portion to receive it in the second accommodating portion to unblock the fifth circuit breaker; and switching on the fifth circuit breaker to connect the second power source.

\* \* \* \* \*